T. S. MACOMBER.
Plow.

No. 159,338.

Patented Feb. 2, 1875.

WITNESSES:
E. Neveux
A. F. Terry

INVENTOR:
T. S. Macomber
BY
ATTORNEYS.

UNITED STATES PATENT OFFICE.

THOMAS S. MACOMBER, OF HAMILTON, NEW YORK.

IMPROVEMENT IN PLOWS.

Specification forming part of Letters Patent No. 159,338, dated February 2, 1875; application filed December 28, 1874.

*To all whom it may concern:*

Figure 1:
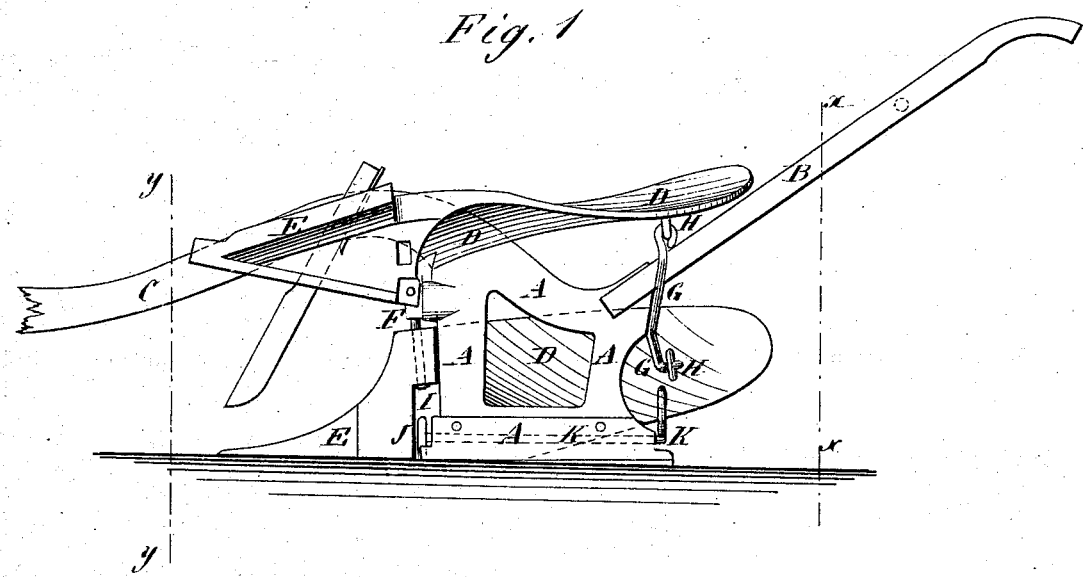
Figure 2:
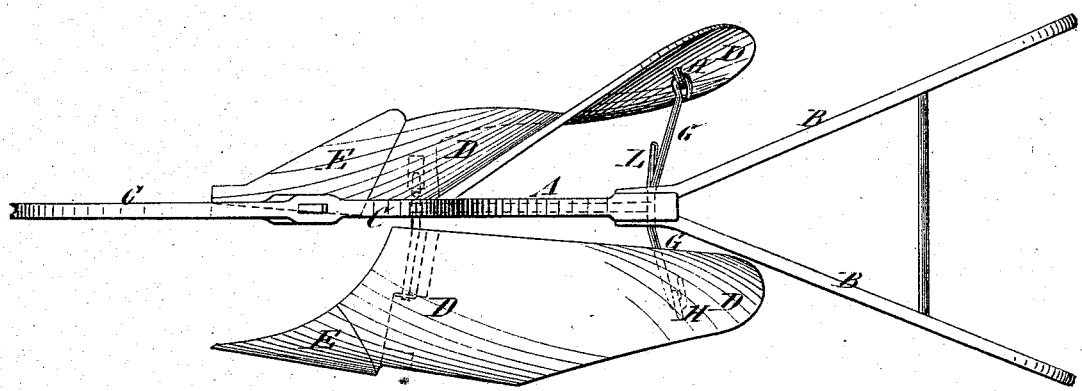
Figure 3:
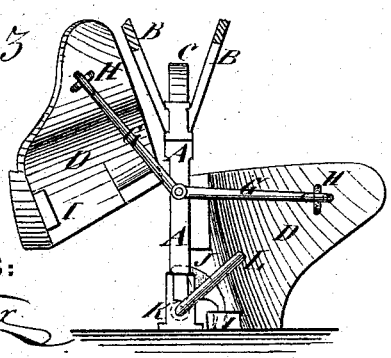
Figure 4:
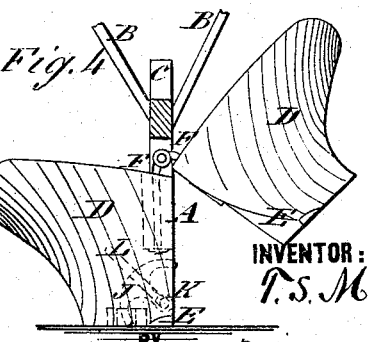

Be it known that I, THOMAS S. MACOMBER, of Hamilton, in the county of Madison and State of New York, have invented a new and useful Improvement in Reversible Double Plow, of which the following is a specification:

Figure 1 is a side view of my reversible double plow, the left-hand mold-board and share being turned up. Fig. 2 is a top view of the same. Fig. 3 is a rear view of the same, partly in section, through the line $x\ x$, Fig. 1. Fig. 4 is a front view of the same, partly in section, through the line $y\ y$, Fig. 1.

Similar letters of reference indicate corresponding parts.

The invention is an improvement in reversible or side-hill plows; and consists in the construction and arrangement of devices whereby the mold-boards and their attached shares are connected to the beam of the plow, as hereinafter fully set forth.

A represents the land-side or central frame of the plow, to the rear upper part of which the handles B are attached, and to the forward upper part of which the beam C is attached. Upon the opposite sides of the land-side A are placed two mold-boards, D, each of which is provided with a share, E. Upon the upper forward part of each of the mold-boards and shares D E is formed an eye, F, to receive a stud, pin, or bolt formed upon or attached to the upper forward part of the land-side A. G is a bent arm, which is pivoted at its angle to the rear upper part of the land-side A. The outer ends of the arm G have hooks formed upon them, which are hooked into eyes H, formed upon the rear parts of the mold-boards D. Upon the lower forward part of each of the mold-boards D is formed an eye or socket, I, to receive the fluke of the double hook J, placed at the lower forward part of the land-side A, and attached to the forward end of rod K. The rod K passes longitudinally through the lower part of the land-side A, and has a lever, L, formed upon or attached to its rear end, so that by operating the lever L the double hook J may be operated to fasten or unfasten either of the mold-boards D. By this construction, by turning the right-hand mold-board down against the land-side, the other mold-board will be raised into a horizontal position, forming a right-hand plow, and by turning the left-hand mold-board down against the land-side the right-hand mold-board will be raised into a horizontal position, forming a left-hand plow. This construction enables the shares and mold-boards to be so made as to form a perfect-turning plow, which cannot be done when making an ordinary reversible plow.

Having thus described my invention, I claim as new and desire to secure by Letters Patent—

The combination of the eyes F and their pivot, the bent bar G, and its pivot-eyes H, the double hook J, the eyes or sockets I, the rod K, and lever L, with the two mold-boards and shares D E, and the land-side A, substantially as herein shown and described.

THOMAS S. MACOMBER.

Witnesses:
S. P. MACOMBER,
MARY E. MACOMBER.